United States Patent [19]

Henden et al.

[11] 4,371,184
[45] Feb. 1, 1983

[54] BIKE TRAILER

[76] Inventors: Derek J. Henden, 56 Woodlands Garden, Muswell Hill, London, England; Stuart R. Morris, 195 Waller Rd., New Cross, London, S.E.14, England

[21] Appl. No.: 232,974

[22] Filed: Feb. 9, 1981

[51] Int. Cl.³ .......................... B60D 1/00; B62K 27/12
[52] U.S. Cl. ..................................... 280/204; 280/485; 280/495
[58] Field of Search ............... 280/204, 292, 483, 484, 280/485, 486, 492, 495; 403/223, 287, 234, 235, 237

[56] References Cited

U.S. PATENT DOCUMENTS

| | | | |
|---|---|---|---|
| 1,458,894 | 6/1923 | Schwarz | 403/223 |
| 3,012,796 | 12/1961 | Mieding | 280/204 |
| 3,829,125 | 8/1974 | Davis | 280/204 |
| 4,274,649 | 6/1981 | Vanderhorst et al. | 280/204 |
| 4,307,893 | 12/1981 | Ragland | 280/204 |

FOREIGN PATENT DOCUMENTS

| | | | |
|---|---|---|---|
| 380406 | 5/1940 | Italy | 280/204 |
| 322858 | 6/1957 | Switzerland | 280/204 |

Primary Examiner—Joseph F. Peters, Jr.
Assistant Examiner—Donn McGiehan
Attorney, Agent, or Firm—Kenyon & Kenyon

[57] ABSTRACT

A cycle trailer comprising a lightweight frame supported on a pair of road wheels and having a draw-bar for attachment to the towing cycle. The connection between the draw-bar and towing cycle comprises a flexible rubber tube clamped to the end of the draw-bar and a spigot clamped to the cycle pillar which engages in the tube and is releasably held by a pin extending through the tube and spigot. The flexible rubber tube permits the cycle to lean when cornering without upsetting the trailer and also to turn with respect to the trailer.

12 Claims, 5 Drawing Figures

BIKE TRAILER

BACKGROUND OF THE INVENTION

1. Field of the Invention

This invention relates to lightweight trailers and is particularly although not exclusively applicable to trailers for towing behind lightweight self-propelled vehicles such as cycles.

2. Description of the Prior Art

Cycle trailers have been commonly used for many years and such trailers normally have draw-bars connected to the cycle frame by a simple eye-and-pin towing attachment. Such an arrangement permits very little pivotal movement in the fore and aft direction so that it is not possible to lean the cycle towing a trailer in the natural manner when taking corners which restricts the cornering speed of the assembly and the general rigidity of the coupling causes the cyclist to be acutely aware of the trailer being towed.

An object of the invention is to provide a coupling which reduces the effect of the trailer on the cycle and, in particular, reduces the restriction on leaning of the cycle when cornering.

SUMMARY OF THE INVENTION

The invention provides a lightweight trailer having a body to support a pay-load, a pair of wheels, a draw-bar extending from the body for attachment to a towing vehicle and a coupling for releasably connecting the free end of the draw-bar to a part of the towing vehicle comprising a spigot having means for attachment to a part of the towing vehicle and a flexible tubular element the respective ends of which receive the free end of the draw bar and spigot and means to fix the tubular element to one of the spigot and draw bar and to provide a releasable connection between the tubular element and the other of the spigot and draw-bar so that the trailer can be separated from the towing vehicle when required and the flexible tubular element can cater for variation in attitude between the towing vehicle and trailer.

DETAILED DESCRIPTION OF SOME SPECIFIC EMBODIMENTS

Figure 1:
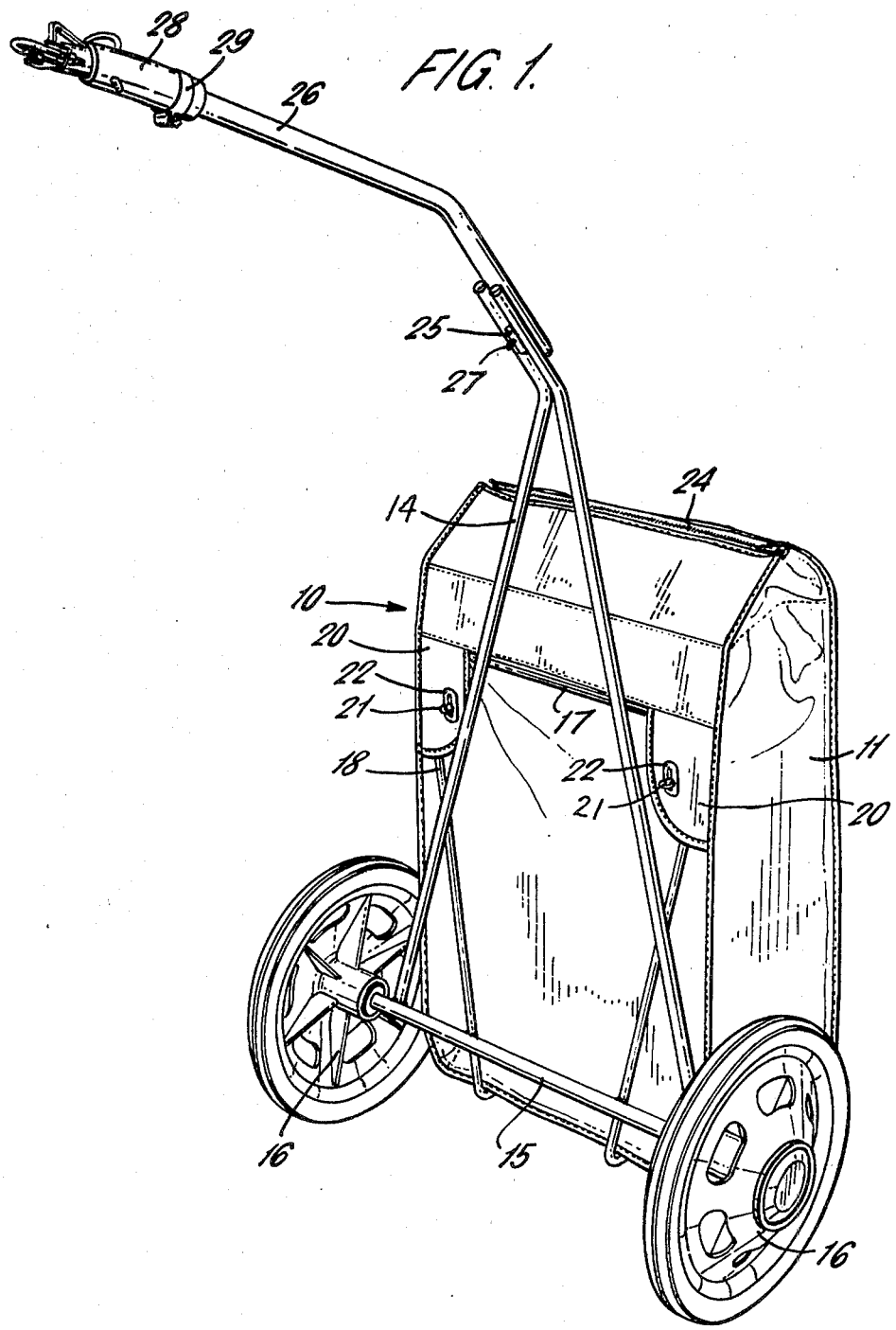
FIG. 1 is a front perspective view of a cycle trailer.
Figure 2:
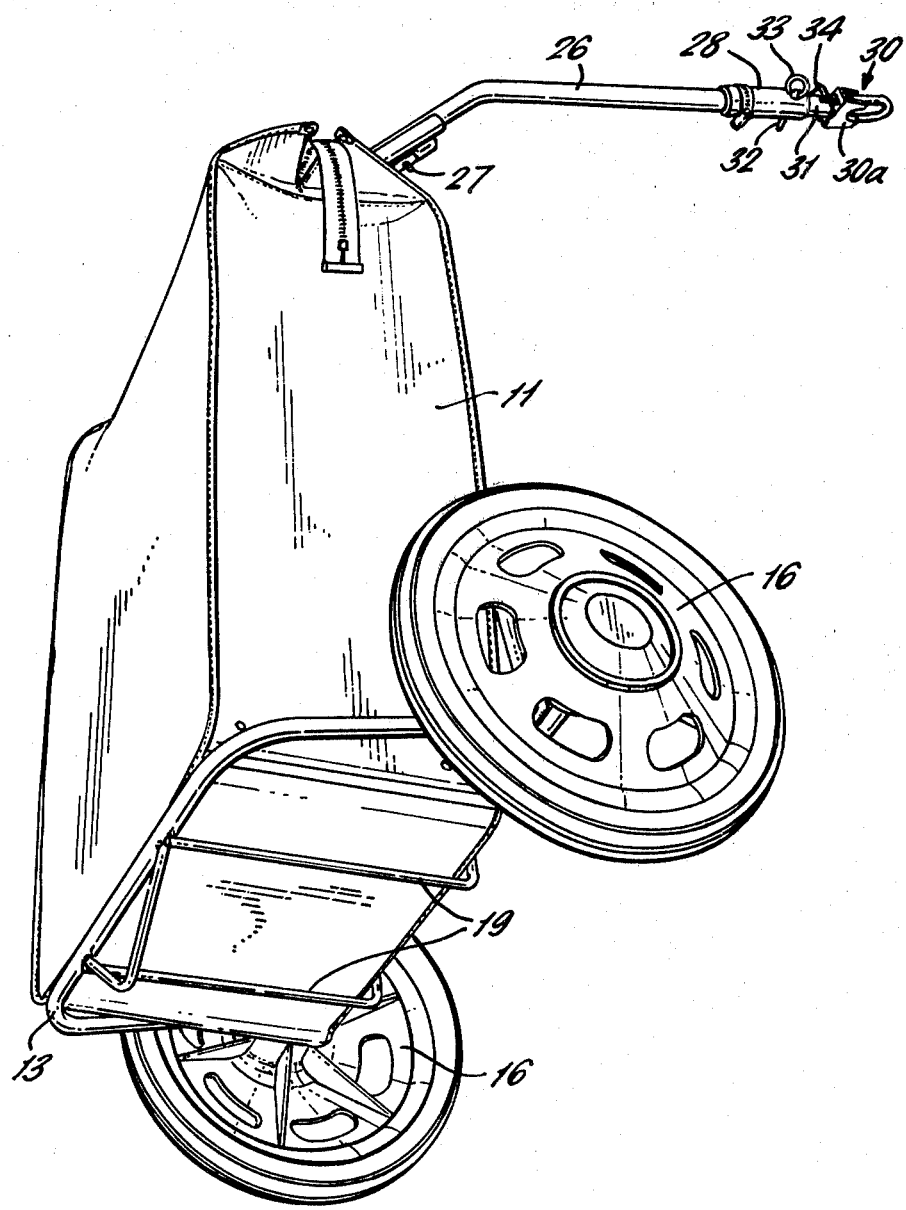
FIG. 2 is a perspective view of the underneath of the cycle trailer.

Referring firstly to FIGS. 1 and 2 of the drawings there is shown a lightweight cycle trailer comprising a chassis indicated generally at 10 which, in side elevation, is generally in the form of an L to provide a platform for carrying a bag 11.

The chassis 10 comprises a main frame formed from a single piece of tubular metal shaped by bending to form a U-shaped base 13 and a V-shaped upright 14 extending at right angles to the base. The tubular cross-member 15 is welded to the spaced arms of the V-shape at the intersection with the U-shape to receive an axle rod the ends of which project from the tube and carry road wheels 16. The wheels are supported on bearing races on the axle rod for free rotation with respect to the axle rod. The wheels are shod with semi-pneumatic rubber or plastics tyres, that is tyres which contain air cavities but are not inflated.

The chassis comprises a further subsidiary frame formed from metal rods and comprising an inverted U-shaped lying against the main V-shape and secured thereto by welding at each such location. The corners between base 17 and leg 18 of the U-shape lie beyond the sides of the V-shape of the main frame to provide attachments for the bag 11 as described later and just below the axle carrying tube 15, the ends of the U are bent forwardly at right angles to form supports 19 extending forwardly to the base of the U-shape 13 of the main frame. The rear side of the bag is formed with pockets 20 into which the corners between base 17 and legs 18 of the subsidiary frame engage and are held therein by means of turn-buckles 21 mounted on the rear wall of the bag which are locked through slots 22 in the side of the pockets. The arrangement therefore permits the bag to be readily removed from the trailer when it is not required. The bag can be provided with a zip top 24.

The upper ends 12 of the main frame at the top of the V are bent to lie together side-by-side at an oblique angle to the V-shape and are attached to a bridging piece 25 disposed between them by welding. A draw-bar 26 for the trailer has one end secured by a bolt 27 to the bridging piece 25 and at the other end a stiff but flexible rubber tube 28 is fitted over the end of the draw-bar and is secured by a hose clip 29. A U-bolt clamp 30 having a spigot 31 projecting from the base 30a thereof is provided for attachment to the seat pillar of the bicycle with the spigot 31 extending rearwardly to engage in the other end of the flexible tube 28. The tube 28 and spigot 31 are formed with transverse bores through which a pin 32 extends to lock the spigot in the tube. The pin 32 carries a ring 33 to enable it to be extracted to release the spigot from the tube. The cross-piece base 30a of the U-bolt clamp carries an upwardly projecting abutment 34 to bear against the rear side of the seat pillar of the bicycle to prevent the U-bolt clamp from riding up when the trailer imposes a forward load on the seat pillar during braking.

Figure 3:
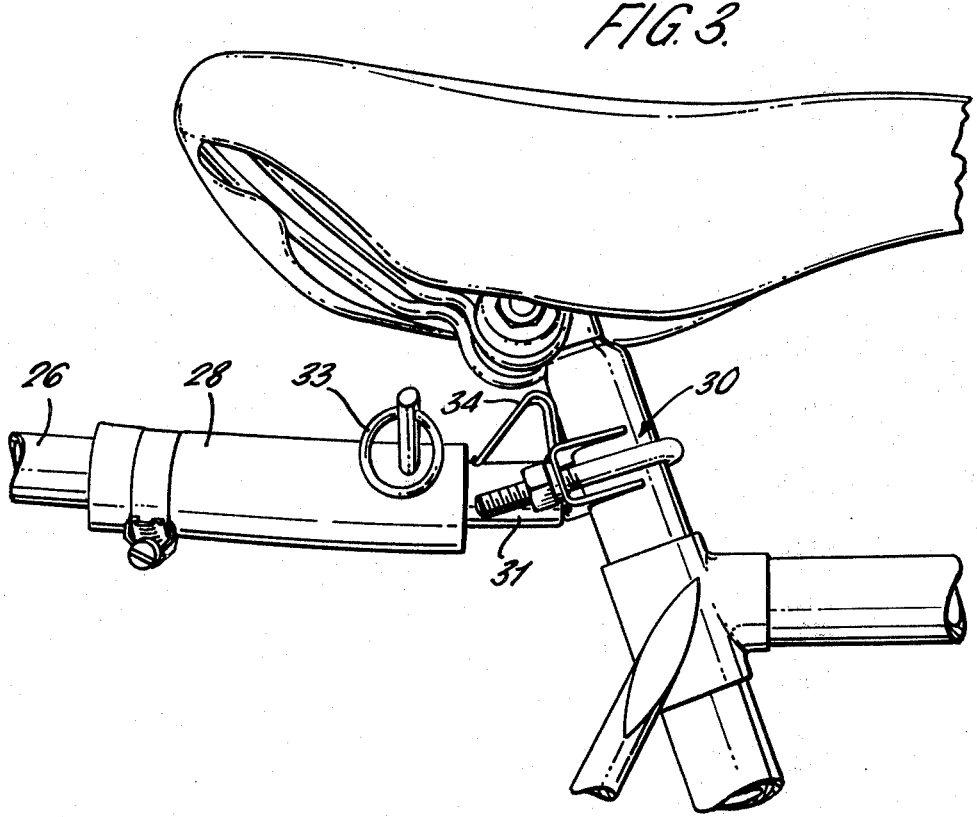
FIG. 3 is a side elevation view of the cycle trailer in tow by a cycle.
Figure 4:
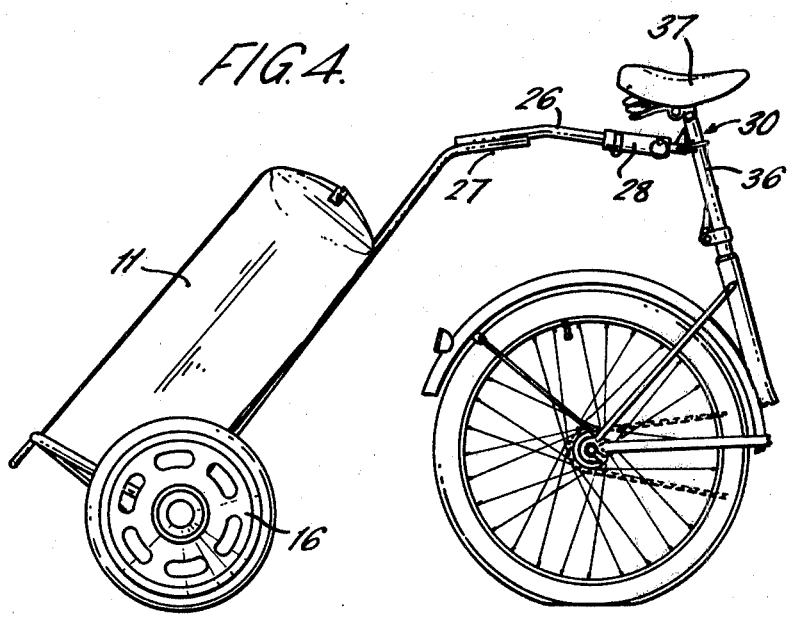
FIG. 4 is a detailed view of the coupling between a cycle and trailer.

One version of the trailer is shown attached to a bicycle indicated in FIGS. 3 and 4 of the drawings and it will be seen that the U-bolt clamp 30 is secured to the seat pillar 36 of the cycle immediately below the seat and the draw-bar 26 is shaped to hold the trailer chassis well clear of the rear part of the cycle. Draw-bars of different lengths are provided to suit large or small rear wheeled cycles. The coupling is shown in detail in FIG. 3.

The flexible tube 28 provides all the necessary universal coupling movement required between the trailer and cycle during normal towing of the cycle so that the cyclist is free to manoeuvre and guide the cycle while towing the trailer without being impeded by the trailer since the flexible coupling will accommodate any normal difference in turning angle between the cycle and the trailer. Also the cycle can be leaned to one side or the other when cornering at speed without restriction by the trailer.

Figure 5:
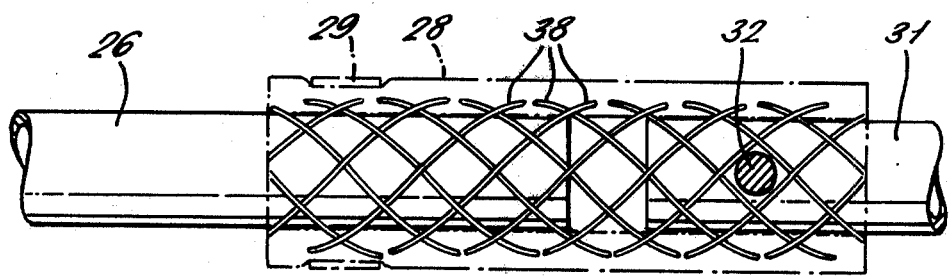
FIG. 5 is a further detailed view of part of the coupling.

The construction of the flexible tube 28 is illustrated in greater detail in FIG. 5 to which reference is now made. The tube comprises a flexible rubber fabric reinforced tube or hose (e.g. a hose capable of withstanding pressures up to 250 p.s.i.) the fabric reinforcement comprising a cris-cross mesh of threads 38 embedded within the wall of the tube. An indicated earlier, the tube is freely slidable on and off the spigot 31 and is held on the spigot by the pin 32. The tube so held is subjected to tension when the trailer is being towed by the cycle and the resulting slight longitudinal stretching of the tube causes the reinforcement mesh to close tightening or contracting the hose on the spigot 31 and causing the hose to bind to the spigot.

When the trailer is not required to be towed by the cycle, it is simply released from the cycle by extracting the pin 32 and then withdrawing the tubular element off the spigot which is left in place. The trailer can be used as a shopping-trailer. When the draw-bar 26 is not required, it can simply be removed or reversed by loosening the bolt 27.

Draw-bars of different lengths and shapes (see FIGS. 2 and 4) may be provided to suit different cycles and an appropriate draw-bar can simply be attached to the trailer by means of the bolt 27. Thus if the trailer is equipped with a short draw-bar suitable for a small rear wheeled cycle and it is required to use the trailer with a large rear wheel cycle, the original short draw-bar can simply be removed from the trailer by releasing the bolt 27 and a draw-bar of appropriate length and shape attached to the trailer chassis. Further, the spigot 31 may be formed integrally with the cycle frame or with a rear luggage carrier mounted on the frame to project rearwardly therefrom to receive the tubular connector element 28 of the trailer draw-bar.

We claim:

1. A lightweight trailer having a body to support a pay-load, a pair of wheels, a draw-bar extending from the body for attachment to a towing vehicle and a coupling for releasably connecting the free end of the draw-bar to a part of the towing vehicle comprising a spigot having means for attachment to a part of the towing vehicle and a flexible tubular element the respective ends of which receive the free end of the draw bar and spigot and means to fix the tubular element to one of the spigot and draw bar and to provide a releasable connection between the tubular element and the other of the spigot and draw-bar so that the trailer can be separated from the towing vehicle when required and the flexible tubular element can cater for variation in attitude between the towing vehicle and trailer.

2. A trailer as claimed in claim 1 wherein means are provided for fixing the tubular element to the free end of the draw bar and further means are provided for connecting the tubular element releasably to the spigot.

3. A trailer as claimed in claim 2 wherein the means for providing a releasable connection between the tubular element and the spigot comprise a pin extending through aligned transverse openings in the tubular element and spigot, the pin being extractable to allow the spigot to be withdrawn from the tubular element.

4. A trailer as claimed in claim 1 wherein the tubular element comprising a flexible rubber tube having a cris-cross reinforcing mesh which causes the tube to contract radially when subjected to tension to bind the tube to the spigot.

5. A trailer as claimed in claim 1 wherein the means on the spigot for attachment of the spigot to the vehicle comprise a U-bolt clamp having a cross-piece secured to the spigot and a U-bolt for securing the spigot to a generally upwardly extending element of a towing vehicle.

6. A trailer as claimed in claim 5 wherein an upwardly projecting abutment is formed on the cross-piece of the U-bolt clamp to bear against the face of the upwardly extending element of the vehicle to which the U-bolt clamp is attached to resist upward tilting of the U-bolt clamp due to the action of the trailer on the vehicle.

7. A trailer as claimed in claim 1 wherein the draw-bar is secured to the body of the trailer by a releasable bolt to enable the draw-bar to be detached when not required.

8. A trailer as claimed in claim 1 wherein the wheels of the trailer are shod with 'semi-pneumatic' tyres.

9. A trailer as claimed in claim 1 wherein an axle is mounted on the body and the wheels are supported on bearings on the axle.

10. A trailer as claimed in claim 1 wherein the body comprises a generally L-shaped frame providing a platform to support a pay-load, the wheels being mounted at the apex of the L and the draw-bar extending from the upper end of the L.

11. A trailer as claimed in claim 10 in combination with a bag mounted on the trailer to carry a pay-load.

12. A lightweight trailer as claimed in claim 1 for towing by a cycle wherein the draw-bar is adapted for attachment to the seat pillar of the cycle and the draw-bar is shaped to extend over the rear wheel of the cycle to support the trailer with clearance from the rear of the cycle.

* * * * *

UNITED STATES PATENT AND TRADEMARK OFFICE
CERTIFICATE OF CORRECTION

PATENT NO. : 4,371,184
DATED : February 1, 1983
INVENTOR(S) : Derek J. Henden and Stuart R. Morris It is certified that error appears in the above—identified patent and that said Letters Patent is hereby corrected as shown below:

Column 1, lines 65-66 - delete "intersection with the U-shape" and insert --apex of the L--

Column 2, line 7 - change "U-shaped" to --U-shape--

Column 2, line 9 - change "leg" to --legs--

Column 2, line 24 - change "12" to --14--

Signed and Sealed this

Nineteenth Day of July 1983

[SEAL]

Attest:

GERALD J. MOSSINGHOFF

Attesting Officer    Commissioner of Patents and Trademarks